United States Patent
Sugaya et al.

(10) Patent No.: US 6,218,447 B1
(45) Date of Patent: Apr. 17, 2001

(54) RESIN COMPOSITION CONTAINING MULTILAYERED GRAFT POLYMER

(75) Inventors: Takahiko Sugaya, Kobe; Norio Nagata, Kakogawa; Akira Takaki, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/423,387

(22) PCT Filed: Apr. 22, 1999

(86) PCT No.: PCT/JP99/02153

§ 371 Date: Nov. 8, 1999

§ 102(e) Date: Nov. 8, 1999

(87) PCT Pub. No.: WO99/55779

PCT Pub. Date: Nov. 4, 1999

(30) Foreign Application Priority Data

Apr. 27, 1998 (JP) .................................................. 10-117220

(51) Int. Cl.⁷ ........................................................ C08L 23/18
(52) U.S. Cl. ........................... 523/201; 525/193; 525/309
(58) Field of Search ............................ 523/201; 525/193, 525/309

(56) References Cited

U.S. PATENT DOCUMENTS

| | | | |
|---|---|---|---|
| 4,513,118 | * | 4/1985 | Suetterlin et al. ............... 525/81 |
| 4,542,171 | * | 9/1985 | Elser et al. ..................... 523/201 |
| 4,707,513 | * | 11/1987 | Baer ............................... 524/504 |
| 4,876,313 | * | 10/1989 | Lorah . |
| 4,879,348 | * | 11/1989 | Henton ........................... 525/305 |
| 4,916,171 | * | 4/1990 | Brown et al. ................... 523/161 |
| 4,997,883 | * | 3/1991 | Fischer et al. .................... 525/67 |
| 5,081,166 | * | 1/1992 | Kiehlbauch et al. .............. 523/201 |
| 5,349,025 | * | 9/1994 | Siol et al. ...................... 525/309 |
| 5,576,393 | * | 11/1996 | Yamashita et al. .............. 525/293 |
| 5,612,413 | * | 3/1997 | Rozkuszka et al. .............. 525/85 |
| 5,798,406 | * | 8/1998 | Feret et al. .................... 524/501 |
| 5,827,611 | * | 10/1998 | Forbes ............................ 428/375 |
| 5,928,830 | * | 7/1999 | Rath et al. ..................... 430/313 |
| 5,994,428 | * | 11/1999 | Lutz et al. ..................... 523/201 |

FOREIGN PATENT DOCUMENTS

| | | | |
|---|---|---|---|
| 0897954 | * | 8/1999 | (EP) . |
| 0989144 | * | 3/2000 | (EP) . |
| 5-17654 | | 1/1993 | (JP) . |
| 9-286830 | | 11/1997 | (JP) . |
| 10-338723 | | 12/1998 | (JP) . |

* cited by examiner

Primary Examiner—Jeffrey C. Mullis
(74) Attorney, Agent, or Firm—Armstrong, Westerman, Hattori, McLeland & Naughton

(57) ABSTRACT

A methacrylic resin composition having excellent transparency, appearance, weatherability, gloss, impact resistance and processability, which comprises a methacrylic resin and a graft copolymer having a multilayer structure prepared by polymerizing a monomer component comprising an alkyl methacrylate such as methyl methacrylate as a main component in the presence of a chain transfer agent to form an innermost layer of a crosslinked methacrylic polymer, polymerizing a monomer component comprising an alkyl acrylate such as butyl acrylate as a main component in the presence of the innermost layer polymer to form an intermediate layer and subsequently polymerizing a monomer component comprising an alkyl methacrylate such as methyl methacrylate as a main component to form an outermost layer on the intermediate layer.

3 Claims, No Drawings

RESIN COMPOSITION CONTAINING MULTILAYERED GRAFT POLYMER

TECHNICAL FIELD

The present invention relates to a resin composition comprising a graft copolymer having a multilayer structure and a methacrylic resin, and more particularly to a methacrylic resin composition having good impact resistance, transparency, appearance, weatherability, gloss and processability, particularly good impact resistance, transparency and appearance, which is incorporated with a multilayer-structured graft copolymer.

The resin composition of the present invention containing a graft copolymer having a multilayer structure exhibits an excellent strength while maintaining the transparency and appearance of methacrylic resins on a high level and, therefore, it is suitable for use in various fields which require such characteristics, for example, as transparent front panel of automatic vending machines.

BACKGROUND ART

Methacrylic resins have excellent transparency, appearance, weatherability, gloss and processability and, therefore, have been industrially used in large amounts in various fields. However, they have an essential drawback of being poor in impact resistance. In general, improvement of the impact resistance of methacrylic resins has been made by introducing a multilayer-structured material having a rubber phase to methacrylic resins to form a two phase structure to thereby impart a strength, and various proposals based thereon have been made.

For example, Japanese Patent Publication Kokoku No. 55-27576 discloses improving the impact resistance of methacrylic resins by incorporating methacrylic resins with a polymer having a three layer structure prepared by polymerizing a monomer component containing methyl methacrylate as a main component to form an innermost layer, then polymerizing a second monomer component containing butyl acrylate as a main component in the presence of the innermost layer to form a second layer on the innermost layer, and further polymerizing a third monomer component containing methyl methacrylate as a main component to form an outermost layer on the second layer. However, it is unavoidable that peculiar beautiful appearance and transparency that methacrylic resins possess are impaired by the incorporation, and improvement of the impact resistance is also insufficient. It is the actual circumstances that there has not been provided a resin composition, as demanded in the market, which exhibits a sufficient impact resistance with maintaining the properties of methacrylic resins without impairing the appearance and transparency and which has a good heat stability as required in molding.

It is an object of the present invention to improve the impact resistance of methacrylic resins without impairing the properties thereof such as appearance and transparency.

A further object of the present invention is to provide a methacrylic resin composition having excellent transparency, appearance and impact resistance as well as good weatherability, gloss and processability.

DISCLOSURE OF THE INVENTION

A study about incorporation of a graft copolymer having a multilayer structure into methacrylic resins has been made in order to improve the impact resistance without impairing beautiful appearance, transparency, weatherability, gloss and processability of the methacrylic resins. Thus, it has now been found that the above objects can be achieved when, upon polymerization for forming the innermost layer of a multilayer methacrylic graft copolymer, the polyemrization is carried out in the presence of a chain transfer agent.

In accordance with the present invention, there is provided a resin composition comprising (A) 50 to 5% by weight of a graft copolymer having a multilayer structure and (B) 50 to 95% by weight of a methacrylic resin, wherein said graft copolymer (A) is prepared by:

(A-1) polymerizing a monomer mixture (X) comprising (a) an alkyl methacrylate having a $C_1$ to $C_4$ alkyl group and (b) at least one monomer selected from the group consisting of an alkyl acrylate having a $C_1$ to $C_{12}$ alkyl group, an aromatic vinyl monomer and other copolymerizable monomers in an (a)/(b) ratio of 40:60 to 100:0 by weight and (c) 0.01 to 10 parts by weight of a polyfunctional monomer per 100 parts by weight of the total of the components (a) and (b) in the presence of (d) 0.01 to 2 parts by weight of a chain transfer agent per 100 parts by weight of the total of the components (a) and (b) to give an innermost layer of a crosslinked methacrylic polymer (I), (A-2) polymerizing a monomer mixture (Y) comprising (e) an alkyl acrylate having a $C_1$ to $C_{12}$ alkyl group and (f) at least one monomer selected from the group consisting of an aromatic vinyl monomer and other copolymerizable monomers in an (e)/(f) ratio of 60:40 to 100:0 by weight and (g) 0.1 to 5 parts by weight of a polyfunctional monomer per 100 parts by weight of the total of the components (e) and (f) in the presence of said crosslinked methacrylic polymer (I), the (I)/(Y) ratio of said crosslinked methacrylic polymer (I) to said monomer mixture (Y) being 10:90 to 60:40 by weight, to give a rubber-like polymer (II), and (A-3) polymerizing a monomer component (Z) comprising (h) an alkyl methacrylate having a $C_1$ to $C_4$ alkyl group and (i) at least one monomer selected from the group consisting of an alkyl acrylate having a $C_1$ to $C_{12}$ alkyl group and other copolymerizable monomers in an (h)/(i) ratio of 60:40 to 100:0 by weight in the presence of said rubber-like polymer (II), the (II)/(Z) ratio of said rubber-like polymer (II) to said monomer mixture (Z) being 60:40 to 90:10 by weight, to give multilayer graft copolymer (A).

BEST MODE FOR CARRYING OUT THE INVENTION

In the preparation of the graft copolymer having a multilayer structure of the present invention, crosslinked methacrylic polymer (I) which constitutes the innermost layer of the graft copolymer, is firstly prepared by polymerizing a monomer mixture (X) comprising (a) an alkyl methacrylate having a $C_1$ to C4 alkyl group, (b) at least one monomer selected from the group consisting of an allyl acrylate having a $C_1$ to $C_{12}$ alkyl group, an aromatic vinyl monomer and other copolymerizable monomers and (c) a polyfunctional monomer, the (a)/(b) ratio being 40:60 to 100:0 by weight, to which (d) a chain transfer agent is added in an amount of 0.01 to 2 parts by weight per 100 parts by weight of the total of the components (a) and (b).

The components (a) and (b) are used in an (a)/(b) ratio of 40:60 to 100:0 by weight. If the amount of the alkyl methacrylate (a) is less than 40 parts by weight based on 100 parts by weight the total of the components (a) and (b), excellent features that methacrylic resins possess are not exhibited.

The amount of the polyfunctional monomer (c) is from 0.01 to 10 parts by weight, preferably from 0.05 to 3 parts, more preferably from 0.2 to 1 part, per 100 parts by weight of the total of the components (a) 10 and (b). If the amount of the polyfunctional monomer (c) is less than 0.01 part, the transparency of the obtained resin composition is lowered, and if the amount is more than 10 parts by weight, the impact strength-improving effect of the graft copolymer is lowered.

The chain transfer agent (d) is used in an amount of 0.01 to 2 parts, preferably 0.1 to 0.8 part, per 100 parts by weight of the total of the components (a) and (b). If the amount of the chain transfer agent (d) is more than 2 parts by weight, the strength-improving effect of the graft copolymer is lowered.

Examples of the alkyl methacrylate (a) having a $C_1$ to $C_4$ alkyl group are, for instance, methyl methacrylate, ethyl methacrylate, n-butyl methacrylate, isobutyl methacrylate and t-butyl methacrylate. These may be used alone or in admixture thereof.

The alkyl methacrylate (a) may be used alone, or may be used in combination with the monomer (b) as occasion demands. The monomer (b) is at least one member selected from the group consisting of an alkyl acrylate having a $C_1$ to $C_{12}$ alkyl group, an aromatic vinyl monomer and other copolymerizable monomer. Examples of the alkyl acrylate having a $C_1$ to $C_{12}$ alkyl group are, for instance, ethyl acrylate, n-butyl acrylate, n-octyl acrylate, 2-ethylhexyl acrylate, and the like. Examples of the acromatic vinyl monomer are, for instance, styrene, α-methylstyrene, chlorostyrene and other styrene derivatives. Examples of the copolymerizable monomer other than the above-mentioned alkyl methacrylate and acrylate and the aromatic vinyl monomer are, for instance, an acrylic or methacrylic acid ester such as hexyl methacrylate, cyclohexyl (meth)acrylate, 2-ethylhexyl methacrylate, octyl methacrylate, isobornyl (meth)acrylate, phenyl (meth)acrylate, benzyl (meth) acrylate or hydroxyethyl methacrylate, an unsaturated nitrile compound such as acrylonitrile or methacrylonitrile, an α,β-unsaturated carboxylix acid such as acrylic acid, methacrylic acid or crotonic acid, vinyl acetate, an olefin monomer such as ethylene or propylene, a halogenated vinyl monomer such as vinyl chloride, vinylidene chloride or vinylidene fluoride, a maleimide monomer such as N-ethylmaleimide, N-propylmaleimide, N-cyclohexylmaleimide or N-o-chlorophenylmaleimide, and the like. Each of the alkyl acrylate, aromatic vinyl monomer and other copolymerizable monomer may be used alone or in combination of two or more compounds. The alkyl acrylates having a $C_1$ to $C_{12}$ alkyl group and the aromatic vinyl monomers are preferable as the component (b). In case of using the alkyl acrylates and/or the aromatic vinyl monomers as the component (b), these monomers may be used in combination with at most 40% by weight of other copolymerizable monomers as mentioned above based on the total weight of the component (b).

Any of known crosslinking agents or monomers can be used as the polyfunctional monomer (c). Preferable examples of the crosslinking monomer are, for instance, allyl methacrylate, allyl acrylate, diallyl maleate, diallyl fumarate, diallyl itaconate, monoallyl maleate, monoallyl fumarate, butadiene, divinyl benzene, and the like. These may be used alone or in admixture thereof.

Generally known chain transfer agents can be used in the present invention as the chain transfer agent (d). Example of the chain transfer agent (d) are, for instance, a mercaptan compound such as n-butylmercaptan, n-octylmercaptan, n-hexadecylmercaptan, n-dodecylmercaptan, t-dodecylmercaptan, n-tetradecylmercaptan or t-tetradecylmercaptan, a thioglycolate such as 2-ethylhexyl thioglycolate, ethylene glycol dithioglycolate, trimethylolpropane tris(thioglycolate) or pentaerythritol tetrakis (thioglycolate), thiophenol, tetraethylthiuram disulfide, pentanephenylethane, acrolein, methacrolein, allyl alcohol, carbon tetrachloride, ethylene bromide, and the like. Of these, n-dodecylmercaptan, a tertiary mercaptan such as t-dodecylmercaptan and thiophenol are preferred. The chain transfer agents may be used alone or in admixture thereof.

An intermediate layer is then formed on the crosslinked methacrylic polymer (I) to give rubber-like polymer (II). The rubber-like polymer (II) is prepared by polymerizing a monomer mixture (Y) comprising (e) an alkyl acrylate having a $C_1$ to $C_{12}$ alkyl group, (f) at least one monomer selected from the group consisting of an aromatic vinyl monomer and other copolymerizable monomers and (g) a polyfunctional monomer, the (e)/(f) ratio being 60:40 to 100:0 by weight, in the presence of the crosslinked methacrylic polymer (I).

As the alkyl acrylate (e) having a $C_1$ to $C_{12}$ alkyl group, there can be used those explained about the component (b). The alkyl acrylate (e) may be the same as or different from the alkyl acrylate used as the component (b).

The alkyl acrylate (e) may be used alone or in combination with the monomer (f). The monomer (f) is at least one member selected from the group consisting of an aromatic vinyl monomer and other copolymerizable monomer. As the aromatic vinyl monomer in the component (f), there can be used those explained about the component (b). The aromatic vinyl monomer may be the same as or different from the aromatic vinyl monomer used as the component (b). Examples of the copolymerizable monomer other than the above-mentioned alkyl acrylate and the aromatic vinyl monomer are, for instance, an acrylic or methacrylic acid ester such as ethyl methacrylate, propyl methacrylate, butyl methacrylate, hexyl methacrylate, cyclohexyl methacrylate, 2-ethylhexyl methacrylate, octyl methacrylate, isobornyl (meth)acrylate, phenyl (meth)acrylate, benzyl (meth) acrylate or hydroxyethyl (meth)acrylate, an unsaturated nitrile compound such as acrylonitrile or methacrylonitrile, an α,β-unsaturated carboxylix acid such as acrylic acid, methacrylic acid or crotonic acid, vinyl acetate, an olefin monomer such as ethylene or propylene, a halogenated vinyl monomer such as vinyl chloride, vinylidene chloride or vinylidene fluoride, a maleimide monomer such as N-ethylmaleimide, N-propylmaleimide, N-cyclohexylmaleimide or N-o-chlorophenylmaleimide, and the like. These may be used alone or in admixture thereof. The aromatic vinyl monomers are preferable as the component (f). In case of using the aromatic vinyl monomers as the component (f), these monomers may be used in combination with at most 40% by weight of other copolymerizable monomers as mentioned above based on the total weight of the component (f).

Also, as the polyfunctional monomer (g), there can be used those explained about the component (c). The polyfunctional monomer (g) may be the same as or different from the polyfunctional monomer used as the component (c).

A chain transfer agent such as a mercaptan may be used in the polymerization of the monomer mixture (Y).

The components (e) and (f) are used in an (e)/(f) ratio of 60:40 to 100:0 by weight, preferably 70:30 to 90:10 by weight. If the amount of the alkyl acrylate (e) is less than 60 parts by weight based on 100 parts by weight of the total of the components (e) and (f), the impact resistance-improving effect of the obtained graft copolymer is lowered and also the transparency is lowered.

The amount of the polyfunctional monomer (g) is from 0.1 to 5 parts by weight, preferably from 1 to 3 parts, per 100 parts by weight of the total of the components (e) and (f). If the amount of the polyfunctional monomer (g) is less than 0.1 part, the transparency and impact strength of the obtained resin composition is lowered, and if the amount is more than 5 parts by weight, the impact strength is lowered.

The crosslinked methacrylic polymer (I) and the monomer mixture (Y) are used in an (I)/(Y) ratio of 10:90 to 60:40 by weight. If the amount of the crosslinked methacrylic polymer (I) is less than 10 parts by weight based on 100 parts by weight of the total weight of the crosslinked polymer (I) and the monomer mixture (Y), the transparency is lowered. If the amount of the crosslinked methacrylic polymer (I) is more than 60 parts by weight, the impact strength tends to be lowered.

The outermost layer is then formed on the rubber-like polymer (II) to give the graft copolymer (A) having a multilayer structure. The outermost layer is formed by polymerizing a monomer component (Z) comprising (h) an alkyl methacrylate having a $C_1$ to $C_4$ alkyl group and optionally (i) at least one monomer selected from the group consisting of an alkyl acrylate having a $C_1$ to $C_{12}$ alkyl group and other copolymerizable monomers in the presence of the rubber-like polymer (II).

As the alkyl methacrylate (h) having a $C_1$ to $C_4$ alkyl group, there can be used those explained about the component (a). The alkyl methacrylate (h) may be the same as or different from the compound used as the component (a). As the alkyl acrylate having a $C_1$ to $C_{12}$ alkyl group in the component (i), there can be used those explained about the component (b). The alkyl acrylate may be the same as or different from the alkyl acrylate used as the component (b). Examples of the copolymerizable monomer other than the above-mentioned alkyl acrylate and methacrylate are, for instance, an acrylic or methacrylic acid ester such as hexyl methacrylate, cyclohexyl (meth)acrylate, 2-ethylhexyl methacrylate, octyl methacrylate, isobornyl (meth)acrylate, phenyl (meth)acrylate, benzyl (meth)acrylate or hydroxyethyl (meth)acrylate, an aromatic vinyl monomer such as styrene, o-methylstyrene, m-methylstyrene, p-methylstyrene or α-methylstyrene, an unsaturated nitrile compound such as acrylonitrile or methacrylonitrile, an α,β-unsaturated carboxylix acid such as acrylic acid, methacrylic acid or crotonic acid, vinyl acetate, an olefin monomer such as ethylene or propylene, a halogenated vinyl monomer such as vinyl chloride, vinylidene chloride or vinylidene fluoride, a maleimide monomer such as N-ethylmaleimide, N-propylmaleimide, N-cyclohexylmaleimide or N-o-chlorophenylmaleimide, and the like. These may be used alone or in admixture thereof. The alkyl acrylates having a $C_1$ to $C_{12}$ alkyl group are preferable as the component (i). In case of using the alkyl acrylates as the component (i), these monomers may be used in combination with at most 40% by weight of other copolymerizable monomers as mentioned above based on the total weight of the component (i).

The components (h) and (i) are used in an (h)/(i) ratio of 60:40 to 100:0 by weight. If the amount of the alkyl methacrylate (h) is less than 60 parts by weight based on 100 parts by weight of the total of the components (h) and (i), the impact strength and transparency are lowered and the productivity may also be lowered.

The rubber-like polymer (II) and the monomer component (Z) is used in a (II)/(Z) ratio of 60:40 to 90:10 by weight. If the amount of the rubber-like polymer polymer (II) is less than 60 parts by weight based on 100 parts by weight of the total weight of the rubber-like polymer (II) and the monomer component (Z), the transparency is lowered. If the amount of the rubber-like polymer (II) is more than 90 parts by weight, the impact strength and transparency tend to be lowered.

In the formation of the outermost layer, namely in the polymerization of the monomer component (Z), a polyfunctional monomer (crosslinking monomer) and/or a chain transfer agent such as a mercaptan may be used, as occasion demands.

The multilayer graft copolymer (A) used in the present invention can be prepared in a usual emulsion polymerization manner using a known emulsifier. In obtaining the multilayer graft copolymer having well-balanced physical properties, it is preferable that the graft copolymer (A) in the obtained latex has an average particle size of 1,000 to 4,500 Å, especially 1,500 to 4,000 Å. The multilayer graft copolymer is obtained in the form of a powder by spray-drying the obtained multilayer graft copolymer latex, or in a generally known manner by coagulating the latex with addition of a salt or an acid, heat-treating the coagulated latex and filtering the graft copolymer followed by washing and drying. If required, an antioxidant or a ultraviolet absorber as generally used may be added at the time of coagulation.

The thus obtained multilayer graft copolymer has well-balanced properties such as appearance, transparency, weatherability, gloss and processability, and can be blended with various resins. When it is blended with a methacrylic resin, there can be provided a resin composition which exhibits excellent properties such as weatherability, gloss and processability without impairing excellent appearance and transparency peculiar to the methacrylic resin.

The methacrylic resins used in the present invention are resins containing at least 50% by weight of units of an alkyl methacrylate having a $C_1$ to $C_4$ alkyl group. The multilayer graft copolymer (A) of the present invention is applicable to those generally called methacrylic resins. Representative examples of the methacrylic resin (B) used in the present invention are homo and copolymers of 50 to 100% by weight of methyl methacrylate and 50 to 0% by weight of other monomers copolymerizable therewith. The other copolymerizable monomers include, for instance, an acrylic or methacrylic acid ester such as methyl acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, octyl (meth)acrylate, isobornyl (meth)acrylate, phenyl (meth)acrylate, benzyl (meth) acrylate or hydroxyethyl (meth)acrylate, an aromatic vinyl monomer such as styrene, o-methylstyrene, m-methylstyrene, p-methylstyrene or α-methylstyrene, an unsaturated nitrile compound such as acrylonitrile or methacrylonitrile, an α,β-unsaturated carboxylix acid such as acrylic acid, methacrylic acid or crotonic acid, vinyl acetate, an olefin monomer such as ethylene or propylene, a halogenated vinyl monomer such as vinyl chloride, vinylidene chloride or vinylidene fluoride, a maleimide monomer such as N-ethylmaleimide, N-propylmaleimide, N-cyclohexylmaleimide or N-o-chlorophenylmaleimide, and the like. These may be used alone or in admixture thereof.

The blending ratio of the methacrylic resin (B) and the multilayer graft copolymer (A) varies depending on the uses of the resin composition, but preferably they are blended in amounts of 50 to 95% by weight of the methacrylic resin and 50 to 5% by weight of the graft copolymer, the total thereof being 100% by weight. If the amount of the methacrylic resin is less than 50% by weight, the characteristics of the methacrylic resin is lost, and if the amount is more than 95% by weight, the impact strength is not sufficiently improved.

The blending manner for preparing the resin composition of the present invention is not particularly limited, and various known methods such as extrusion mixing and roll mixing are applicable.

The resin composition of the present invention may contain usual additives such as anitioxidant, ultraviolet absorber, light stabilizer, and others.

The present invention is then explained by means of examples, but these examples are intended to illustrate the invention and are not to be construed to limit the scope of the invention. In the following examples, all % and parts are by weight unless otherwise noted.

EXAMPLE 1

Preparation of Multilayer Graft Copolymer (A)
(a) Polymerization for Crosslinked Methacrylic Polymer (innermost layer)

A glass reactor was charged with a mixture having the following composition.

| Mixture | part |
|---|---|
| Deinonized water | 220 |
| Boric acid | 0.3 |
| Sodium carbonate | 0.03 |
| N-Lauroylsarcosine sodium salt | 0.09 |
| Formaldehyde sodium sulfoxylate | 0.09 |
| Disodium ethylenediaminetetraacetate | 0.006 |
| Ferrous sulfate heptahydrate | 0.002 |

After elevating the temperature to 80° C. with stirring in a nitrogen stream, the reactor was charged at a time with 25% of a mixture of 0.1 part of t-butyl hydroperoxide (BHPO) with an innermost layer monomer component composed of 25 parts of methyl methacrylate, 0.1 part of allyl methacrylate and 0.1 part of t-dodecylmercaptan, and the polymerization was carried out for 45 minutes.

Subsequently, the remaining 75% of the mixture was continuously added to the reactor over 1 hour. After the completion of the addition, the reaction system was kept at 80° C. for 2 hours to complete the polymerization. During this period, 0.2 part of N-lauroylsarcosine sodium salt was added. The polymer particles in the obtained latex of innermost layer crosslinked methacrylic polymer had an average particle size of 1,600 Å (measured using light scattering at a wavelength of 546 nm). The polyemrization conversion (amount of polymer produced/amount of monomer charged) was 98%.
(b) Polymerization for Rubber-like Polymer After adding 0.1 part of potassium persulfate to the crosslinked methacrylic polymer latex obtained in (a) which was kept at 80° C. in a nitrogen stream, a monomer mixture of 41 parts of n-butyl acrylate, 9 parts of styrene and 1 part of allyl methacrylate was continuously added to the latex over 5 hours. During this period, potassium oleate was added three times in an amount of 0.1 part in total. After the completion of the addition of the monomer mixture, 0.05 part of potassium persulfate was further added and the reaction system was kept for 2 hours to complete the polymerization. The obtained rubber-like polymer had an average particle size of 2,300 Å, and the polymerization conversion was 99%.
(c) Polymerization for Outermost Layer The obtained rubber-like polymer latex obtained in (b) was kept at 80° C. After adding 0.02 part of potassium persulfate thereto, a monomer mixture of 24 parts of methyl methacrylate, 1 part of n-butyl acrylate and 0.1 part of t-dodecylmercaptan was continuously added to the latex over 1 hour. After the completion of the addition of the monomer mixture, the reaction system was further kept for 1 hour to give an aqueous latex of a multilayer graft copolymer. The multilayer graft copolymer in the latex had an average particle size of 2,530 Å, and the polymerization conversion was 99%.

The obtained multilayer graft copolymer latex was subjected to salting out for coagulation, heat treatment and drying in a known manner to give a white powder of the multilayer graft copolymer. The thermal decomposition temperature of the obtained multilayer graft copolymer was measured by differential thermal analysis DTA using Thermal Analysis Station TAS-100 made by Rigaku Denki Kabushiki Kaisha in an air stream of 50 ml/minute under conditions of temperature elevation rate 10° C./minute, standard sample α-alumina and weight of each of standard sample and measuring sample about 5 mg. An intersecting point of the base line of the DTA chart and the maximum slope of a peak was determined as the thermal decomposition starting temperature.

The results of measurement of thermal decomposition starting temperature are shown as DTA in Table 1.
Preparation of Resin Composition The obtained multilayer graft copolymer was mixed with a methacrylic resin (methacrylic resin MG-102 made by ICI Ltd., copolymer of methyl methacrylate 98% and ethyl acrylate 2%) in a ratio of 40:60 by weight. The resulting mixture was incorporated with 0.1% of a phosphorus stabilizer (TNPP) and was pelletized using a single screw extruder equipped with a vent (screw diameter 40 mm, L/D=28) by kneading and extruding at a temperature of 200 to 230° C. The obtained pellets were dried at 80° C. for more than 4 hours and injection-molded at 255° C. to give plate samples having a size of 100×150×3 mm for evaluation of physical properties. Using the obtained samples, haze was measured at 23° C. according to JIS K 6714, and a Gardner impact strength was measured using a weight of 1.7 kg according to ASTM D 3029-GB. The results are shown in Table 2.

EXAMPLE 2

A graft copolymer having a multilayer structure was prepared in the same manner as in Example 1 except that the innermost layer of crosslinked methacrylic polymer was prepared from an innermost layer monomer component composed of 12.5 parts of methyl methacrylate, 10 parts of n-butyl acryalte, 2.5 parts of styrene, 0.1 part of allyl methacrylate and 0.1 part of t-dodecylmercaptan. The result of measurement of DTA is shown in Table 1.

Also, a resin composition was prepared by mixing the obtained multilayer graft copolymer with a methacrylic resin in the same manner as in Example 1. The results of measurement of haze and Gardner impact strength thereof are shown in Table 2.

EXAMPLE 3

A graft copolymer having a multilayer structure was prepared in the same manner as in Example 1 except that 0.13 part of n-dodecylmercaptan was used instead of t-dodecylmercaptan in the preparation of the innermost layer of crosslinked methacrylic polymer. The result of measurement of DTA is shown in Table 1.

Also, a resin composition was prepared by mixing the obtained multilayer graft copolymer with a methacrylic resin in the same manner as in Example 1. The results of measurement of haze and Gardner impact strength thereof are shown in Table 2.

Comparative Example 1

A graft copolymer having a multilayer structure was prepared in the same manner as in Example 1 except that t-dodecylmercaptan was not used in the preparation of the innermost layer of crosslinked methacrylic polymer. The result of measurement of DTA is shown in Table 1.

Also, a resin composition was prepared by mixing the obtained multilayer graft copolymer with a methacrylic resin in the same manner as in Example 1. The results of measurement of haze and Gardner impact strength thereof are shown in Table 2.

Comparative Example 2

A graft copolymer having a multilayer structure was prepared in the same manner as in Example 2 except that t-dodecylmercaptan was not used in the preparation of the innermost layer of crosslinked methacrylic polymer. The result of measurement of DTA is shown in Table 1.

Also, a resin composition was prepared by mixing the obtained multilayer graft copolymer with a methacrylic resin in the same manner as in Example 1. The results of measurement of haze and Gardner impact strength thereof are shown in Table 2.

Comparative Example 3

A graft copolymer having a multilayer structure was prepared in the same manner as in Example 1 except that in the preparation of the innermost layer of crosslinked methacrylic polymer, t-dodecylmercaptan was used in an amount of 0.6 part instead of 0.1 part. The result of measurement of DTA is shown in Table 1.

Also, a resin composition was prepared by mixing the obtained multilayer graft copolymer with a methacrylic resin in the same manner as in Example 1. The results of measurement of haze and Gardner impact strength thereof are shown in Table 2.

Control

Test samples were prepared in the same manner as in Example 1 from the methacrylic resin used in Example 1 without blending it with any graft copolymer. The results of measurement of haze and Gardner impact strength thereof are shown in Table 2.

In Table 1, abbreviations denote the following compounds.
MMA: methyl methacrylate
BA: butyl acrylate
St: styrene
AlMA: allyl methacrylate
t-DM: t-dodecylmercaptan
n-DM: n-dodecylmercaptan
KPS: potassium persulfate
BHPO: t-butyl hydroperoxide

TABLE 1

|  | Ex. 1 | Ex. 2 | Ex. 3 | Com. Ex. 1 | Com. Ex. 2 | Com. Ex. 3 |
|---|---|---|---|---|---|---|
| Multilayer graft copolymer Innermost layer monomer component (part) | | | | | | |
| MMA | 25 | 12.5 | 25 | 25 | 12.5 | 25 |
| BA | — | 10 | — | — | 10 | — |
| St | — | 2.5 | — | — | 2.5 | — |
| AlMA | 0.1 | 0.1 | 0.1 | 0.1 | 0.1 | 0.1 |
| t-DM | 0.1 | 0.1 | — | — | — | 0.6 |
| n-DM | — | — | 0.1 | — | — | — |
| initiator | BHPO | BHPO | BHPO | BHPO | BHPO | BHPO |
| Intermediate layer monomer component (part) | | | | | | |
| BA | 41 | 41 | 41 | 41 | 41 | 41 |
| St | 9 | 9 | 9 | 9 | 9 | 9 |
| AlMA | 1 | 1 | 1 | 1 | 1 | 1 |
| initiator | KPS | KPS | KPS | KPS | KPS | KPS |
| Outermost layer monomer component (part) | | | | | | |
| MMA | 24 | 24 | 24 | 24 | 24 | 24 |
| BA | 1 | 1 | 1 | 1 | 1 | 1 |
| t-DM | 0.1 | 0.1 | 0.1 | 0.1 | 0.1 | 0.1 |
| initiator | KPS | KPS | KPS | KPS | KPS | KPS |
| Evaluation result DTA (° C.) | 240 | 250 | 235 | 220 | 230 | 250 |

TABLE 2

|  | Ex. 1 | Ex. 2 | Ex. 3 | Com. Ex. 1 | Com. Ex. 2 | Com. Ex. 3 | Control * |
|---|---|---|---|---|---|---|---|
| Haze (%) | 1.3 | 1.4 | 1.3 | 1.3 | 1.4 | 1.4 | 0.6 |
| Gardner impact strength (kg · cm) | 80 | 90 | 80 | 60 | 70 | 40 | 5 |

* Methacrylic resin alone

INDUSTRIAL APPLICABILITY

Methacrylic resin compositions containing the multilayer graft copolymer according to the present invention exhibit an excellent impact resistance while maintaining excellent transparency, appearance, weatherability and gloss that methacrylic resins originally possess.

What is claimed is:

1. A resin composition comprising (A) 50 to 5% by weight of a graft copolymer having a multilayer structure and (B) 50 to 95% by weight of a methacrylic resin, wherein said graft copolymer (A) is prepared by:

(A-1) polymerizing a monomer mixture (X) comprising (a) an alkyl methacrylate having a $C_1$ to $C_4$ alkyl group and (b) at least one monomer selected from the group consisting of an alkyl acrylate having a $C_1$ to $C_{12}$ alkyl group, an aromatic vinyl monomer and other copolymerizable monomers in an (a)/(b) ratio of 40:60 to 100:0 by weight and (c) 0.01 to 10 parts by weight of a polyfunctional monomer per 100 parts by weight of the total of the components (a) and (b) in the presence of (d) 0.01 to 2 parts by weight of a chain transfer agent per 100 parts by weight of the total of the components (a) and (b) to give an innermost layer of a crosslinked methacrylic polymer (I), (A-2) polymerizing a monomer mixture (Y) comprising (e) an alkyl acrylate having a $C_1$ to $C_{12}$ alkyl group and (f) at least one monomer selected from the group consisting of an aromatic vinyl monomer and other copolymerizable monomers in an (e)/(f) ratio of 60:40 to 100:0 by weight and (g) 0.1 to 5 parts by weight of a polyfunctional monomer per 100 parts by weight of the total of the components (e) and (f) in the presence of said crosslinked methacrylic polymer (I), the (I)/(Y) ratio of said crosslinked methacrylic polymer (I) to said monomer mixture (Y) being 10:90 to 60:40 by weight, to give a rubbery polymer (II), and (A-3) polymerizing a monomer component (Z) comprising (h) an alkyl methacrylate having a $C_1$ to $C_4$ alkyl group and (i) at least one monomer selected from the group consisting of an alkyl acrylate having a $C_1$ to $C_{12}$ alkyl group and other copolymerizable monomers in an (h)/(i) ratio of 60:40 to 100:0 by weight in the presence of said rubber-like polymer (II), the (II)/(Z) ratio of said rubbery polymer (II) to said monomer mixture (Z) being 60:40 to 90:10 by weight, to give multilayer graft copolymer (A).

2. The composition of claim 1, wherein said chain transfer agent is a mercaptan compound.

3. The composition of claim 2, wherein said mercaptan compound is a tertiary mercaptan compound.

* * * * *